United States Patent [19]

Adee

[11] Patent Number: 4,786,070

[45] Date of Patent: Nov. 22, 1988

[54] FOLDING RECUMBENT BICYCLE

[76] Inventor: Grover M. Adee, 1150 Janes Rd., Medford, Oreg. 97501

[21] Appl. No.: 148,043

[22] Filed: Jan. 25, 1988

[51] Int. Cl.⁴ ............................................ B62K 15/00
[52] U.S. Cl. .............................. 280/281 LP; 280/278; 280/287; D12/112
[58] Field of Search ................. 280/281 LP, 278, 287, 280/282, 261, 279; D12/111, 112

[56] References Cited

U.S. PATENT DOCUMENTS

| | | | |
|---|---|---|---|
| 4,182,522 | 1/1980 | Ritchie | 280/278 |
| 4,333,664 | 6/1982 | Turner et al. | 280/261 |
| 4,618,160 | 10/1986 | McElfresh | 280/281 LP |

FOREIGN PATENT DOCUMENTS 1427477  3/1976  United Kingdom ............... 280/287

*Primary Examiner*—David M. Mitchell
*Assistant Examiner*—Mitchell J. Hill
*Attorney, Agent, or Firm*—John F. Ingman

[57] ABSTRACT

A folding recumbent bicycle wherein a bicycle of recumbent design includes a three-section main frame which folds at two hinged locations; a steering bar which folds at a hinged location and handlegrip members which fold to lie along the steering bar; and a seat and backrest which fold down essentially parallel to the main frame member. Forward and rear seat support members may each include a box-like storage compartment.

6 Claims, 4 Drawing Sheets

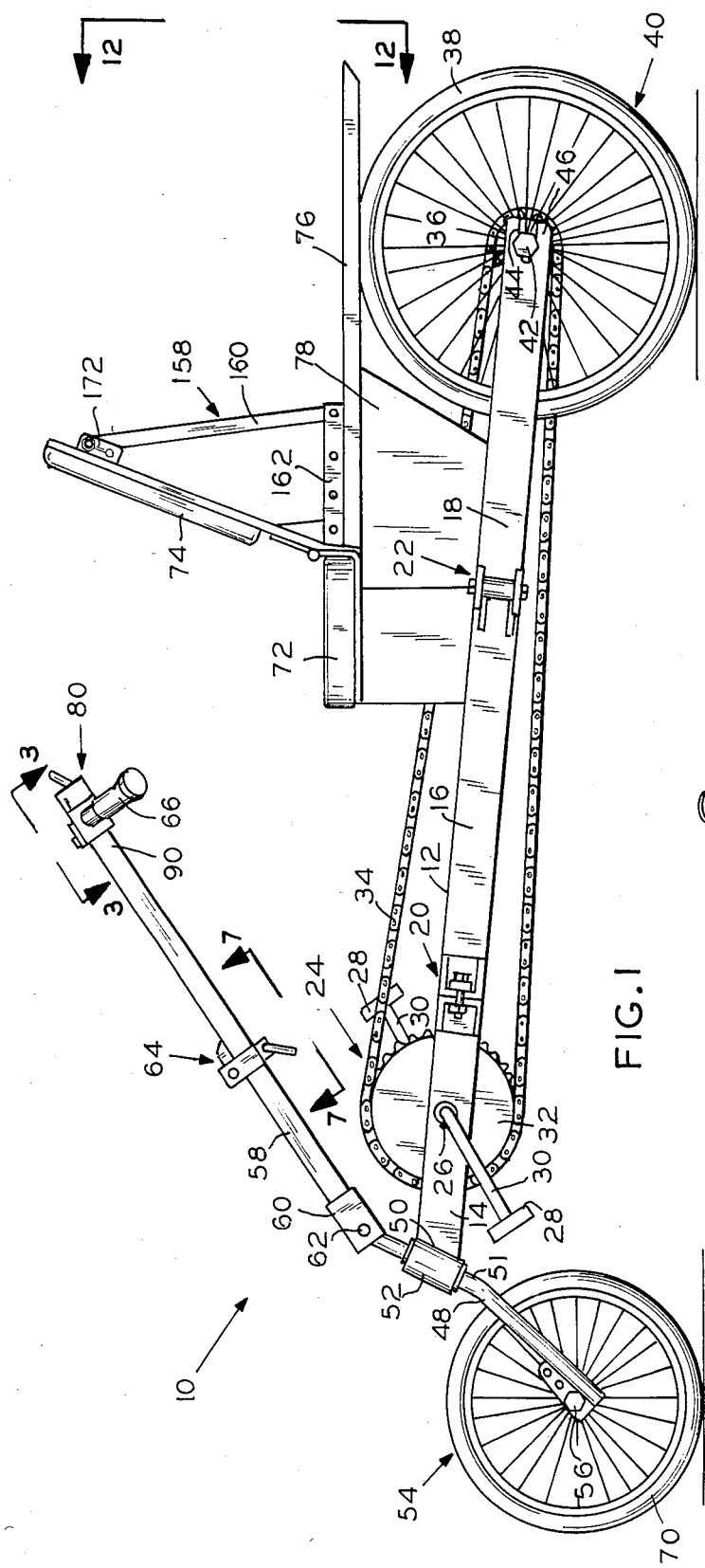
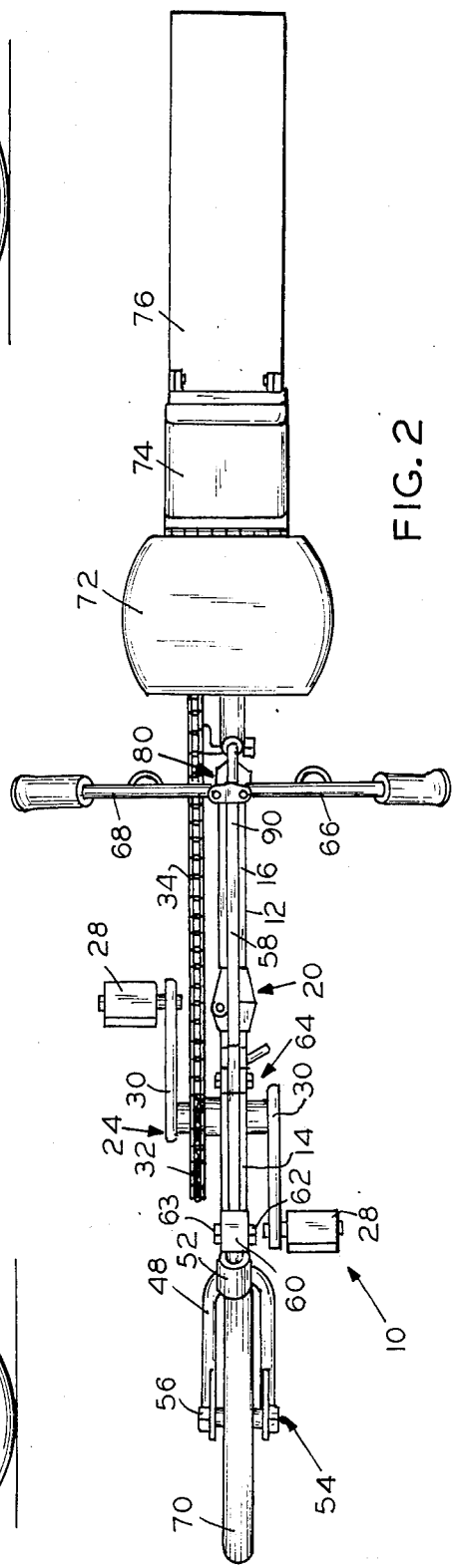
FIG.1
FIG.2

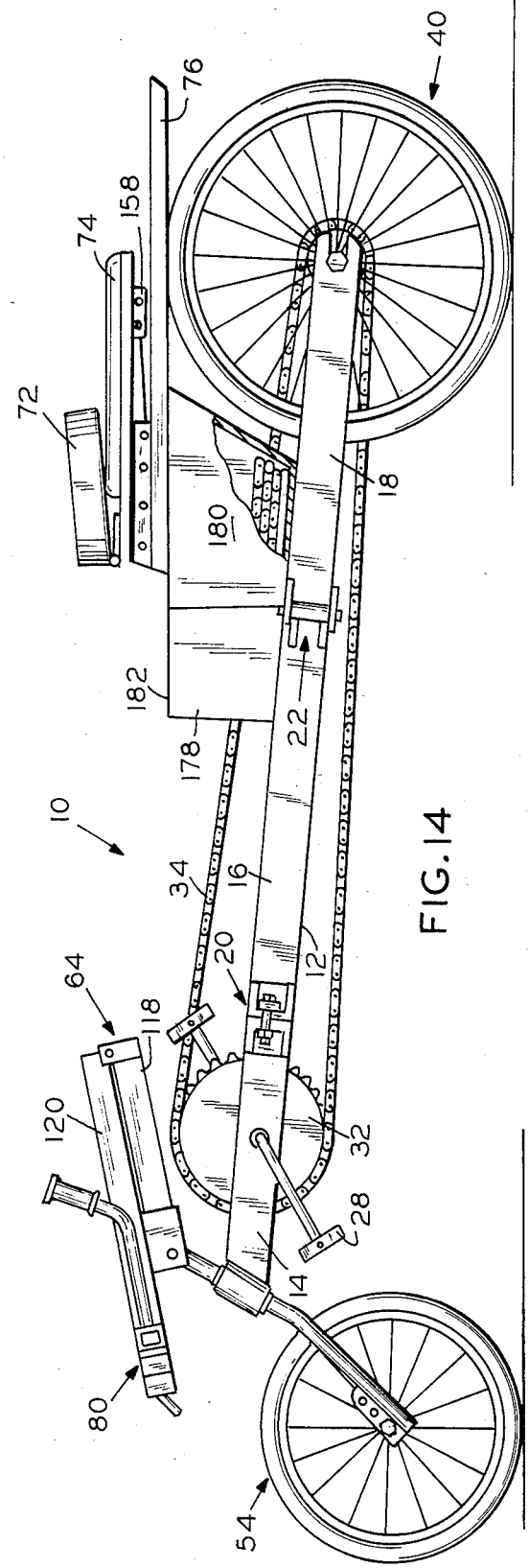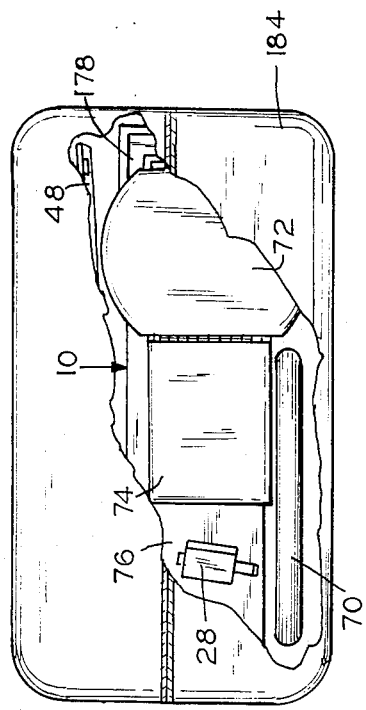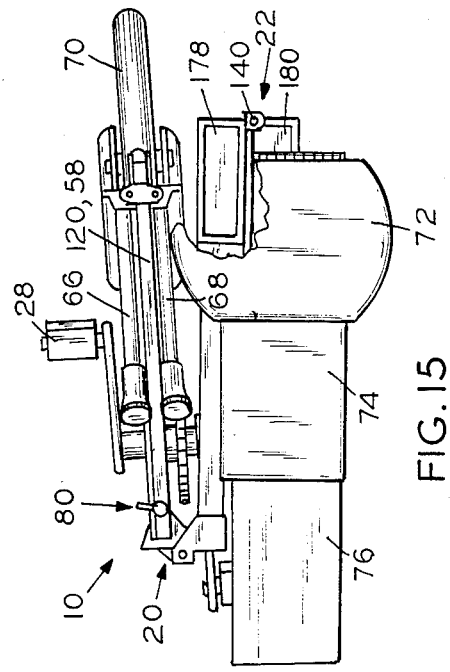

FOLDING RECUMBENT BICYCLE

BACKGROUND OF THE INVENTION

1. Field of the Invention

The present invention generally relates to recumbent bicycles, and, more particularly, a folding recumbent bicycle which is collapsible into a small configuration.

2. Description of the Prior Art

There are a number of bicycles which have been developed in which the rider is seated in a reclining or "recumbent" position. Examples are the recumbent bicycles described in Turner et al, U.S. Pat. No. 4,333,664 and McElfresh, U.S. Pat. No. 4,618,160. Recumbent bicycles have an advantage over conventional bicycles in improved aerodynamics and safety of operation.

However, current recumbent bicycles also have a disadvantage, as compared with conventional bicycles, becuase of their greater size and the resulting difficulty in transporting them between points of use.

What is needed is a bicycle which combines the recumbent riding position for bicycling with a folding capability that enables the machine to be fully portable, so that when folded it is easily transported and can be carried as luggage on airlines, and in buses, taxis and the like; and when unfolded, functions with all of the advantages of recumbent cycling. The folding and unfolding of such recumbent bicycle should be a simple operation which can be performed rapidly and easily.

SUMMARY OF THE INVENTION

The present invention provides a folding recumbent bicycle which is designed to satisfy the aforementioned need. The invention involves a recumbent bicycle design which may be folded together into a small configuration that is easily transportable.

Accordingly, in the preferred embodiment, the invention comprises a recumbent bicycle wherein a three-section main frame folds at two hinged connections; the steering bar folds at a hinged location and the handgrip members fold along the steering bar; and the seat and backrest fold down essentially parallel to the main frame. Forward and rear support members may each include a box-like storage compartment.

If additional space compaction is desired, the front wheel and the right pedal may be removed. In such configuration, the entire recumbent bicycle may be inserted into a flexible carrying case which may be handled as luggage in commercial transportation.

BRIEF DESCRIPTION OF THE DRAWINGS

FIG. 1 illustrates a side view of the instant folding recumbent bicycle in unfolded configuration.

FIG. 2 illustrates a top view of the folding recumbent bicycle of FIG. 1.

FIG. 14 illustrates a partially folded folding recumbent bicycle of FIG. 1 wherein the backrest and backrest support are folded flat against the carrier rack, and the steering bar and handle grips are folded and collapsed, but with the two main frame joints being in unfolded configuration.

FIG. 15 illustrates a top view, in partial section, of the folding recumbent bicycle of FIG. 14, wherein the two main frame joints also have been folded, to place the bicycle in folded configuration.

FIG. 16 illustrates the folded recumbent bicycle of FIG. 15 where in addition the front wheel and the right pedal also have been removed for a minimum space configuration.

DESCRIPTION OF THE PREFERRED EMBODIMENT

Figure 3:
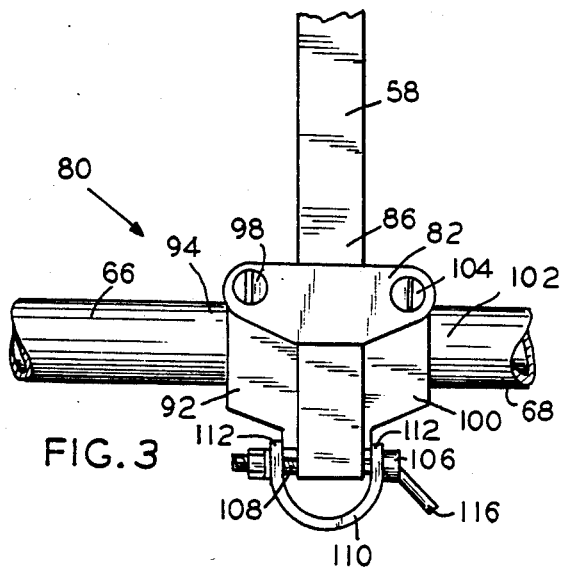
FIG. 3 illustrates a section view, as seen at line 3—3 of FIG. 1, of the convention of steering bar and handgrips in unfolded configuration.

Referring now to the drawings, and in particular FIG. 1 and FIG. 2, there is shown, in a side and top view respectively, the preferred embodiment of the folding recumbent bicycle 10 in an unfolded configuration, ready for riding. A main frame member 12 includes three (3) separate sections, the front section 14, the middle section 16 and the rear section 18. Connecting the front section 16 and the rear section 16 is hinged joint 20, while the middle section 16 is connected to the rear section 18 by hinged joint 22. Hinged joints 20 and 22 will be described in greater detail subsequently. A crank asesmbly 24 is mounted on the front section 14, being supported at and rotating within aperture 26 in a conventional manner. Conventional pedals 28 and cranks 30 may be used; a front sprocket 32 is utilized to impart motion to a drive means, conventionally a chain 34, to a rear wheel sprocket 36 associated with the rear wheel 38. A rear wheel assembly 40, including a rear wheel axle 42 rotatingly supporting the rear wheel sprocket 36 and rear wheel 38, is attached within a notch 44 formed in the rearmost portion 46 of the rear section 18 of the main frame member 12.

At the forward end of the bicycle 10, a front fork member 48 is rotatingly attached at the front end 50 of the front section 14 of the main frame member 12, also in the conventional manner, wherein the front fork member 48 is bearing supported within an inclined fork support 52 which is attached, as by welding, to the front end 50 of the front section 14 of the main frame member 12. As illustrated at 51 in FIG. 1, the front fork member 48 may be bent forward beneath the inclined fork support 52 to provide pedal 28 clearance. A front wheel assembly 54 is attached to and rotatingly supported at the lower end of the front fork member 48 by the front wheel axle 56.

A steering bar member 58 is pivotally attached to the upper end of the front fork member 48 so as to provide an extension of the front fork member 48 towards the rear of the recumbant bicycle 10 as is necessary due to the reclining position of the rider. This attachment provides limited fore-aft movement of the steering bar member 58 so as to provide ready adjustment of the position of the handgrip members 66 and 68 for the needs and comfort of the rider. The attachment is provided by a yoke 60 welded onto the lower end of the steering bar member 58 which embraces the upper end of the front fork member 48, the connection being made by a bolt 62, which penetrates the yoke 60 and front fork member 48, and a nut 63 which tightens and secures bolt 62 thereat.

The steering bar member 58 has a hinged joint 64 intermediate its length, as will be described subsequently. At the upper end 90 of the steering bar member 58, two (2) handgrip members 66 and 68 are pivotally attached at their inner ends. In the unfolded configuration, as best seen at FIG. 2, the handgrip members 66 and 68 extend transversely from the steering bar member 58 in opposing directions, thus forming a handlebar configuration from which the rider may through the steering bar member 58 and the front fork member 48, direct the orientation of the front wheel 70, and thus the direction of movement of the bicycle 10.

A seat 72 and backrest 74 are attached with a carrier rack 76 to a rear seat support 78, which in turn is attached to the rear section 18 of the main frame member 12. It can be seen that the pedals 28 of the crank assembly 24 are positioned well forward of the seat 72, thus the cyclist will ride the bicycle in a reclining or "recumbent" position.

Figure 4:
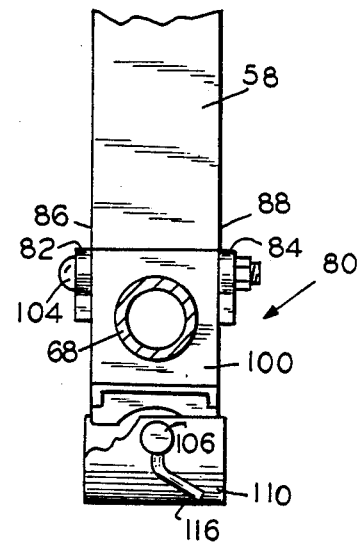
FIG. 4 illustrated a section side view of the connection of steering bar and handgrips as seen at line 4—4 of FIG. 3.
Figure 5:
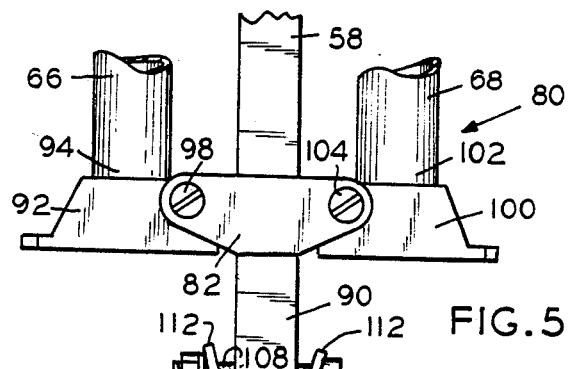
FIG. 5 illustrates the view of the steering bar and handgrips of FIG. 3, wherein the handgrips are in folded position

FIG. 3, 4 and 5 illustrate in greater detail the hinged connection 80 between the steering bar member 58 and the handgrip members 66 and 68. Two hinge plates 82 and 84 are attached, as by welding, on opposing surfaces 86 and 88 of the steering bar member 58 near its upper end 90. A handgrip hinge member 92 is attached at the inner end 94 of handgrip member 66, the handgrip hinge member 92 being formed with an aperature 92 so that hinge bolt 98 pases through the enclosing hinge plates 82 and 84 and the handgrip hinge member 92 to permit the the handgrip member 66 to pivot about the hinge bolt 98. A similar configuration is provided for handgrip member 68 wherein a handgrip hinge member 100 at its inner end 102 pivots about hinge bolt 104 between hinge plates 82 and 84. This hinged connection 80 thus permits the handgrip members 66 and 68 to either be positioned transversely extending from the steering bar member 58, as seen in FIG. 1, 2, 3 and 4 in the unfolded, riding position, or pivoted to lie parallel to the steering bar member 58 as seen in FIG. 5, 14, and 15, in the folded, transport and storage position.

Means to lock the handgrip members 66 and 68 in the transverse position, when in the unfolded, riding position, is provided by a common quick release bolt head 106 with the associated bolt 108 penetrating the steering bar member 58 at its end 90. The quick release bolt 108 also penetrates the ends 112 of a generally U-shaped member 110, which, with the quick release bolt head 106 in the locked position as seen in FIG. 3 and FIG. 4, press against extending lips 114 from the handgrip hinge members 92 and 100 so as to lock the extending lips 114, and thus the end of the handgrip hinge members 92 and 100, firmly against the steering bar member 58. This holds the handgrip members 66 and 68 perpendicular to the steering bar member 58. When the handle 116 of the quick release bolt head 106 is rotated to relax the quick release bolt 108, the U-shaped member 110 expands outwards slightly, thereby freeing the extending lips 114 of the handgrip hinge members 92 and 100 to allow the handgrip members 66 and 68 to be folded about their respective hinge bolts 98 and 104 to a position essentially parallel to the steering bar member 58 as shown in FIG. 5.

Figure 6:
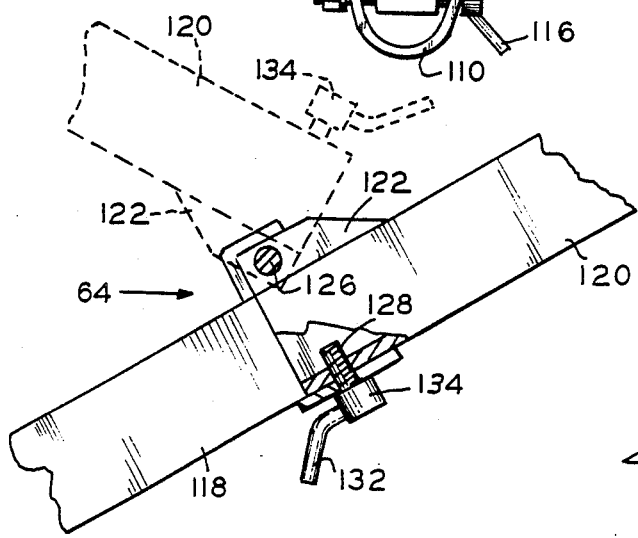
FIG. 6 illustrates a side view of the steering bar joint of FIG. 7, with a partially folded position of the upper portion of the steering bar being shown in dashed lines.
Figure 7:
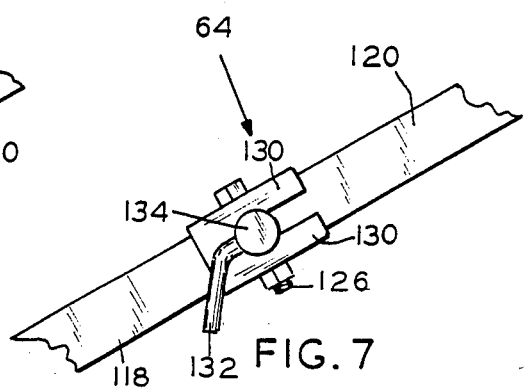
FIG. 7 illustrates a sectional view, as seen at line 7—7 of FIG. 1, of the folding joint of the steering bar in unfolded position.
Figure 10:
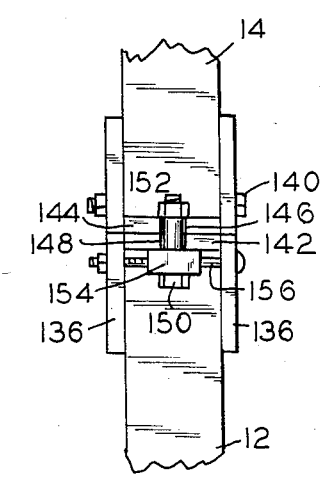
FIG. 10 illustrates a side view of the main frame folding joint of FIG. 8, showing the locking bolt connection thereat.
Figure 8:
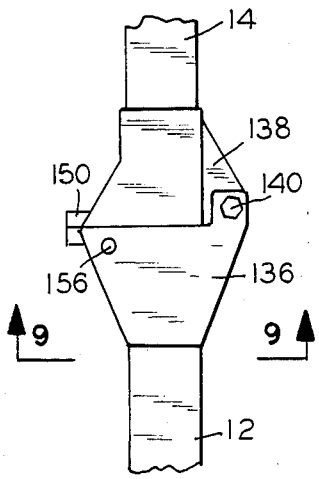
FIG. 8 illustrates a sectional view of a main frame folding joint, as viewed at lines 8—8 and 8A—8A of FIG. 1, in unfolded position.
Figure 11:
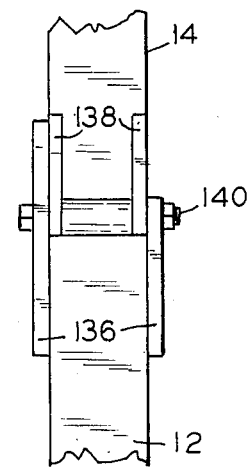
FIG. 11 illustrates a side view of the main frame folding joint of FIG. 8, showing the joint hinge.
Figure 9:
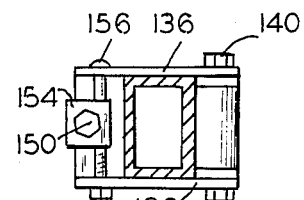
FIG. 9 illustrates a sectional view of the main frame folding joint of FIG. 8 as seen at line 9—9 of FIG. 8.

FIG. 6 and FIG. 7 illustrate the hinged joint 64 located intermediately on the steering bar member 58. The steering bar member 58 is divided into two sections, a lower section 118, which connects with the front fork member 48 at bolt 62, and an upper section 120, which extends to the above described hinged connection 80 with the handgrip members 66 and 68. In the preferred embodiment, the upper section 120 is approximately twice the length of the lower section 118. The hinged joint 64 is created by the formation of a laterally extending hinge extension 122 at the bottom of the upper section 120 which fits within a laterally extending hinge extension 124 atop the lower section 118. A hinge bolt 126 penetrates the two laterally extending hinging extensions 124 and 126, so that when unfolded, the upper section 120 and the lower section 118 are collinear, but when folded, as for transport or storage, the upper section 120 lies essentially parallel to the lower section 118. The upper section 120 and the lower section 118 of the steering bar 58 are held collinear in the unfolded position by a quick release head bolt 128 utilized on the side opposing the hinging extension 122 of the upper section 120, so that the bolt 128 fits between finger extensions 130 attached to the lower section 118, as best seen in FIG. 7. When the quick release head bolt 128 is loosened by turning of its handle 132, sufficient slack is available to pivot the finger extensions 130 from beneath the head 134 of the quick release head bolt 128 to permit pivoting of the upper section 118 about the hinge bolt 126 so that it essentially lies along and is parallel to the lower section 118. Conversely, when the upper section 120 is collinear with the lower section 118 and the finger extensions 130 are beneath the quick release bolt head 134, tightening of the handle 132 will cause the head 134 to press tightly against the finger extensions 130, thus securing the collinear relationship between the two sections.

FIGS. 8, 9, 10 and 11 further illustrate the hinged joints 20 and 22 of the main frame member 12. As indicated previously, the main frame member 12 is divided into three sections: a front section 14, a middle section 16 and a rear section 18, with hinged joint 20 joining the front section 14 and middle section 16 and hinged joint 22 joining the middle section 16 and the rear section 18. The hinged joints 20 and 22 are of identical design but applied to the main frame member 12 to permit hinged folding in opposite directions. This is best seen in FIG. 1 and FIG. 14. The hinged joint 20 or 22 is constructed through the use of a pair of hinge flanges 136, attached, as by welding, to one section, which embrace another pair of hinge flanges 138 which are attached, as by welding, to the other abutting section. A hinge bolt 140 penetrates both pairs of hinge flanges 136 and 138 to provide the axis of rotation for the two main frame sections involved. On the opposing side of the hinge bolt 140 connection, two transverse slot members 142 and 144 are attached, as by welding, by the hinge flanges 136 and 138 respectively. The transverse slot members 142 and 144 are designed so that when the main frame member 12 is in an unfolded configuration and the connected sections are collinear, their slots 146 and 148 are in alignment. A bolt 150 and nut 152 combination fits within the aligned slots 146 and 148 and, when tightened, holds the two transverse slot members 142 and 144 together and thus prevents the hinged connection 20 or 22 from folding. To assure ready availability of the bolt 150 and nut 152, the bolt 150 is attached through a retaining block 154 which in turn is pivotally connected to the enclosing hinge flanges 136, as illustrated, by a rotating shaft 156. Thus, when the hinged sections are unfolded so as to be collinear and the transverse slot members 142 and 144 are aligned, the bolt 150 and nut 152 combination may be pivoted about the axis of shaft 156 so as lay correctly within the slots 146 and 148, ready to be tightened. While a suitable quick release bolt head could be used for this application, it has been found preferable, for strength, to use a common bolt and nut combination.

Figure 12:
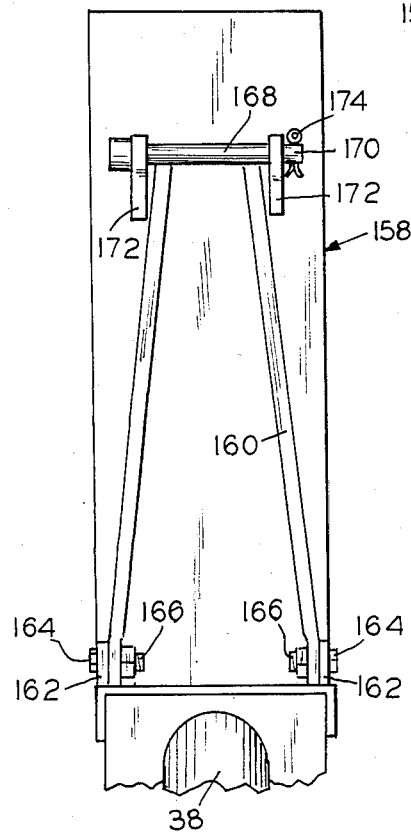
FIG. 12 illustrates the backrest and backrest support frame, as viewed at line 12—12 of FIG. 1.

FIG. 12 illustrates the preferred backrest 74 for the folding recumbant bicycle 10. A frame 158 is used to support the backrest 74, wherein the legs 160 of the frame 158 are rotatably attached to the supporting strips 162 by bolts 164 and 166, while the top, consisting of a horizontally oriented tube 168, is attached to the backrest 74 by passing a bolt 170 through that tube 168 and the support brackets 172 attached to the backrest 74 on each side of the tube 168, as illustrated. The bolt 170 may be secured by a common nut, or as illustrated, by a simple cotter pin 174 to make disassembly simpler. Multiple sets of holes 176 in the backrest support brackets 172 provide a capability of adjusting the position of the backrest 74.

Figure 13:
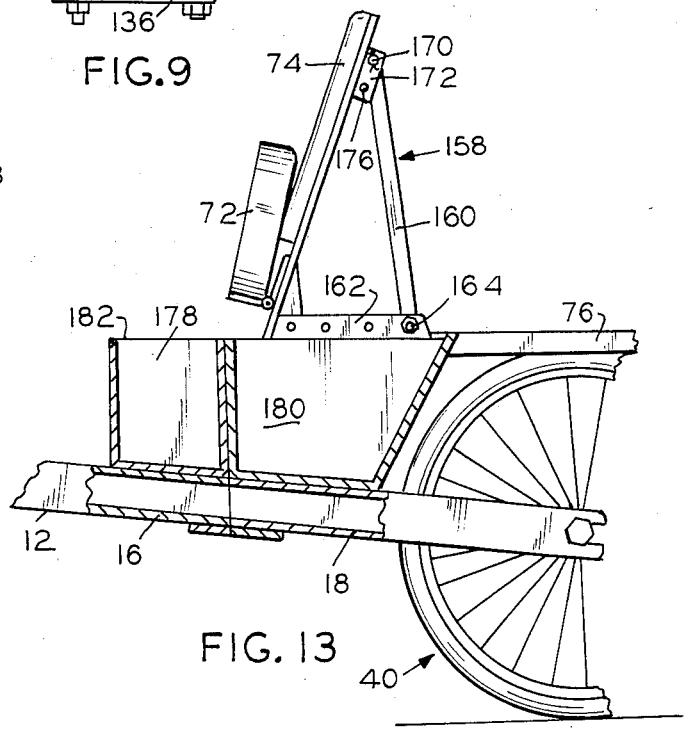
FIG. 13 illustrates an enlarged side view in partial section, illustrating the seat, backrest, and supporting elements, with the seat folded up.

FIG. 13 provides further detail on the seat area of the bicycle. The seat 72 itself is hingedly attached to the backrest 74 so that it may be easily rotated or folded upwards against the backrest 74. At the hinge joint 22 between the rear section 18 and the middle section 16 of the main frame member 12, two box-like members 178 and 180 serve a dual function of supporting the seat 72 and backrest 74 in use and also providing storage compartments. Attached, as by welding, to the rear of the middle section 16 of the main frame member 12 is a forward seat support 178. In use, the forward portion of the seat 72 rests upon the edges 182 of this support 178 and provides a top for the enclosed storage compartment. Similarly, a rear seat support 180 supports a carrier rack 76 and the seat 72 and backrest 74, as well as the backrest supporting frame 158. The forward seat support 178 and the seat support 180, with their respective storage compartments, are separate and fold with the middle section 16 and rear section 18, respectively, of the main frame member 12 and come into abutment along with the sections 16 and 18 when unfolded into the riding configuration.

The folding of the bicycle into a transport or storage configuration is simple and straight forward. Five (5) separate folding operations are required; the order of folding is immaterial, although a user will undoubtedly establish a preferred sequence. The separate folding steps are:

1. Removing of the bolt 168 connecting the seat backrest 74 to the backrest frame 158, folding the backrest frame 158 against the rear carrier rack 76, folding the backrest 74 atop the backrest frame 158, and finally, folding the seat 72 atop the backrest 74.

2. Relasing the quick release handle 116 atop the steering bar member 58 and folding the two handgrip members 66 and 68 parallel to the steering bar member 58.

3. Release the quick release handle 132 at the hinged joint 64 of the steering bar member 58 and folding the upper section 120 of the steering bar member 58 forward atop and parallel to the lower section 118. (FIG. 14 illustrates the folding recumbant bicycle 10 following the above three steps.)

4. Releasing the bolt 150 and nut 152 connection of the rear hinge joint 22 betwen the rear section 18 and the middle section 16 of the main frame member 12 and folding the main frame member 12 at this joint 22 so that the rear and middle sections 18 and 16 are essentially parallel. In conjunction with this folding operation, the drive chain 34 would be removed from the front sprocket 32.

5. Releasing the bolt 150 and nut 152 connection of the front hinge joint 20 between the middle section 16 and the front section 14 of the main frame member 12, and folding the main frame member 12 at this joint 20 so that the middle and front frame sections 16 and 18 are essentially parallel. (FIG. 15 presents a top view wherein the folding recumbent bicycle 10 is folded according to the five steps above.)

Unfolding of the bicycle 10 is simply the reverse of the above steps.

Additional reduction of space may be obtained by removing (or folding, if so designed) the protruding right pedal 28 and the front wheel 70, and realigning them appropriate so as to minimize volume. In this configuration, as shown in FIG. 16, the folding recumbent bicycle 10 can be packaged, as in a nylon or vinyl carrying case 184, suitable for luggage transport.

It is thought that the folding recumbent bicycle of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A folding recumbent bicycle, comprising:
   a main frame member, having a front section, a middle section, and a rear section, each said section having a front end and a rear end, wherein there is a hinged joint between the front section and the middle section, and a hinged joint between the middle section and the rear section;
   a crank assembly, including a front sprocket and foot pedals, which is mounted intermediate the front end and the rear end of the front section of the main frame member;
   a front fork member pivotally attached at the front end of the front section of the main frame member, said front fork member having an upper end and a lower end;
   a front wheel assembly, including a front axle and a front wheel, attached to and rotatably supported by the lower end of the front fork member;
   a steering bar member, having an upper and lower end, attached pivotally at its lower end to the upper end of the front fork member and forming an extension thereto; said steering bar member having a hinged joint intermediate its upper and lower end;

two handgrip members, each having an inner end and an outer end, which are hingedly attached at their inner ends to the upper end of the steering bar member so as to, in an unfolded position, extend transversely to the steering bar member in opposing directions, and in a folded position, to lie essentially parallel to the steering bar member;

a rear wheel assembly attached and supported at the rear end of the rear section of the main frame member, including a rear wheel axle rotatably supporting a rear wheel sprocket and a rear wheel; and a drive chain member extending between the front sprocket of the crank assembly and the rear wheel sprocket.

2. The folding recumbent bicycle, as recited in claim 1, wherein, additionally, there is:

a rear seat support fixedly attached to, and supported by, the rear section of the main frame member;

a seat and backrest, hingedly attached to each other, and to the rear seat support, so as to, in a folded position, lie essentially parallel to each other and to the rear section of the main frame member; and a forward seat support fixedly attached to the middle section of the main frame member so as to provide support to the seat in an unfolded, riding configuration.

3. The folding recumbent bicycle, as recited in claim 2, wherein the rear seat support is attached to and supports a carrier rack extending above the rear wheel.

4. The folding recumbent bicycle, as recited in claim 2, wherein the rear seat support is formed in a box-like configuration as a receptacle for storage.

5. The folding recumbent bicycle, as recited in claim 2, wherein the forward seat support is formed in a box-like configuration as a receptacle for storage.

6. A folding recumbent bicycle, comprising:

a main frame member, having a front section, a middle section, and a rear section, each said section having a front end and a rear end, wherein there is a hinged joint between the front section and the middle section, and a hinged joint between the middle section and the rear section;

a crank assembly, including a front sprocket and foot pedals, which is mounted intermediate the front end and the rear end of the front section of the main frame member;

a front fork member pivotally attached at the front end of the front section of the main frame member, said front fork member having an upper end and a lower end;

a front wheel assembly, including a front axle and a front wheel, attached to and rotatably supported by the lower end of the front fork member;

a steering bar member, having an upper and lower end, attached pivotally at its lower end to the upper end of the front fork member and forming an extension thereto; said steering bar member having a hinged joint intermediate its upper and lower end;

two handgrip members, each having an inner end and an outer end, which are hingedly attached at their inner ends to the upper end of the steering bar member so as to, in an unfolded position, extend transversely to the steering bar member in opposing directions, and in a folded position, to lie essentially parallel to the steering bar member;

a rear wheel assembly attached and supported at the rear end of the rear section of the main frame member, including a rear wheel axle rotatably supporting a rear wheel sprocket and a rear wheel;

a drive chain member extending between the front sprocket of the crank assembly and the rear wheel sprocket;

a rear seat support fixedly attached to, and supported by, the rear section of the main frame member; and rear seat support being formed in a box-like configuration as a receptacle for storage, and also being attached to and supporting a carrier rack extending above the rear wheel;

a seat and backrest, hingedly attached to each other, and to the rear seat support, so as to, in a folded position, lie essentially parallel to each other and to the rear section of the main frame member; and a forward seat support fixedly attached to the middle section of the main frame member so as to provide support to the seat in an unfolded, riding configuration.

* * * * *